United States Patent [19]
Tamada et al.

[11] Patent Number: 5,086,341
[45] Date of Patent: Feb. 4, 1992

[54] LASER SCANNING APPARATUS HAVING TWO, PARALLEL, ACOUSTO OPTIC DEFLECTORS FOR THE HORIZONTAL SCAN

[75] Inventors: Sakuya Tamada; Yasuaki Nakane, both of Tokyo, Japan

[73] Assignee: Sony Corporation, Tokyo, Japan

[21] Appl. No.: 579,923

[22] Filed: Sep. 7, 1990

[30] Foreign Application Priority Data

Sep. 14, 1989 [JP] Japan .................................. 1-238738

[51] Int. Cl.$^5$ .............................................. H04N 5/74
[52] U.S. Cl. ..................................... 358/201; 358/235
[58] Field of Search ................. 358/235, 231, 236, 60, 358/63, 201; 350/358

[56] References Cited

U.S. PATENT DOCUMENTS 4,110,788  8/1978  Merry ........................... 358/63 X Primary Examiner—James J. Groody
Assistant Examiner—Mark R. Powell
Attorney, Agent, or Firm—Philip M. Shaw, Jr.

[57] ABSTRACT

This invention relates to a laser scanning apparatus which raster-scans a laser beam by using an acousto-optic deflector. In this laser scanning apparatus, the laser beam is horizontally scanned by a pair of acousto-optic deflectors. Thus, a laser scanning apparatus can be realized, which is low in noise, excellent in durability, small in size, light in weight and which can display a picture of high quality at high speed.

16 Claims, 6 Drawing Sheets

LASER SCANNING APPARATUS HAVING TWO, PARALLEL, ACOUSTO OPTIC DEFLECTORS FOR THE HORIZONTAL SCAN

BACKGROUND OF THE INVENTION

1. Field of the Invention

The present invention relates generally to laser scanning apparatus and, more particularly, is directed to a laser scanning apparatus which displays a television picture or the like by using a laser beam.

2. Description of the Prior Art

A laser scanning apparatus is known, which displays, for example, a television picture by raster-scanning an intensity modulated laser beam in the horizontal and vertical directions in a two-dimensional manner. As a laser beam scanning system of this laser scanning apparatus, there is proposed a mechanical laser beam scanning system that employs a rotary polygon mirror for horizontal scanning. This mechanical system using the rotary polygon mirror, however, has the following unavoidable shortcomings:

(i) vibration occurs due to shaft whirl of the motor which rotates the rotary polygon mirror;

(ii) noise is produced due to sound emanated by the rotation of the rotary polygon mirror;

(iii) durability of the bearing of the rotary polygon mirror causes a problem;

(iv) since the rotation of the rotary drive motor is not started readily, the mechanical laser beam scanning system can not be started quickly; and (v) since the rotation of the rotary drive motor is not so precisely stabilized, jitter occurs in the displayed image.

FIG. 1 is a schematic diagram showing an example of a raster-scanning type laser display apparatus which uses acousto-optic deflectors for both horizontal and vertical scannings.

Referring to FIG. 1, a laser beam emitted from a laser light source 1 is converged into a small spot size by a laser beam focusing lens 2 and is fed to a known type of acousto-optic light intensity modulator 3. This acousto-optic light intensity modulator 3 changes the intensity of a supersonic wave applied to an acousto-optic medium and thereby changes the efficiency with which a laser beam is deflected by the supersonic wave to thereby modulate the light intensity of the deflected laser beam.

A video signal, though not shown, is supplied to this acousto-optic light intensity modulator 3, whereby the laser beam is intensity-modulated in response to the video signal supplied thereto. The thus intensity-modulated laser beam emitted from the acousto-optic light intensity modulator 3 is supplied to a collimator lens 4, in which it is collimated to provide a laser beam of predetermined diameter. This laser beam is then fed to a horizontal scanning acousto-optic deflector 5.

The acousto-optic deflector 5 is comprised of an acousto-optic medium 5a and a supersonic wave generator 5b attached to one surface of the acousto-optic medium 5a. The supersonic wave generator 5b effectively utilizes the so-called piezoelectric effect. When a voltage is applied to the supersonic wave generator 5b from a high frequency generator 5c, a progressive wave of supersonic vibration is generated in the acousto-optic medium 5a. If the oscillation frequency of the high frequency oscillator 5c is low, then the acousto-optic medium 5a generates a progressive wave of long wavelength. Whereas, if the oscillation frequency of the high frequency oscillator 5c is high, the acousto-optic medium 5a generates a progressive wave of short wavelength.

The laser beam supplied to the acousto-optic deflector 5 is introduced into the acousto-optic medium 5a, wherein it encounters the progressive wave of supersonic vibration, is diffracted and then deflected by this progressive wave. At that time, the shorter the wavelength of the progressive wave of the supersonic vibration, the more the laser beam is deflected. Therefore, if the oscillation frequency of the high frequency oscillator 5c is repeatedly swept from a low frequency to a high frequency in a sawtooth wave fashion, then the laser beam emitted from the acousto-optic deflector 5 is deflected to provide a horizontal scanning laser beam which repeats the deflection scanning.

In order to project an image of high resolution on a screen, it is necessary to increase the diameter of the laser beam incident on the acousto-optic deflector 5. Nevertheless, although the diameter of the laser beam is large, the transmission speed of the progressive wave of supersonic vibration in the acousto-optic medium 5a is finite so that the frequency of the supersonic wave which encounters the laser beam is different in the incident laser beam at the portion near, as opposed to the portion distant, from the supersonic wave generator 5b. Thus, the deflection angle is changed with the position of the beam diameter. More specifically, in the portion near the supersonic wave generator 5b, the laser beam encounters a supersonic wave of high frequency and is considerably deflected, while in the portion distant from the supersonic wave generator 5b the laser beam encounters a supersonic wave of low frequency and is deflected by a small amount. Consequently, the laser beam is not collimated but converged and is then deflected as though it had traveled through a cylindrical lens. This is referred to as a so-called cylindrical lens effect.

The laser beam emitted from the acousto-optic deflector 5 and which becomes the horizontal scanning laser beam that repeats the deflection scanning is supplied to a correcting cylindrical lens 6. The correcting cylindrical lens 6 corrects the above-mentioned cylindrical lens effect and therefore the laser beam, which travels through the correcting cylindrical lens 6, becomes again a parallel laser beam which repeats the horizontal deflection scanning.

The horizontally deflected laser beam which has traveled through this correcting cylindrical lens 6 is supplied to a vertical scanning acousto-optic deflector 7. The acousto-optic deflector 7 has the same structure as the horizontal scanning acousto-optic deflector 5. To be more concrete, a supersonic wave generator 7b utilizing a piezoelectric effect is attached to one surface of an acousto-optic medium 7a and a voltage from a high frequency oscillator 7c is applied to the supersonic wave generator 7b, whereby a progressive wave of supersonic vibration is produced in the acousto-optic medium 7a. Then, the oscillation frequency of the high frequency oscillator 7c is repeatedly swept from a low frequency to a high frequency in a sawtooth wave fashion, thereby causing the incident laser beam to be repeatedly deflected in the vertical direction.

The number of times which the scanning laser beam is repeatedly deflected in the vertical direction is, for example, 60 per second which is small as compared with the above-mentioned horizontal deflection. Therefore, the cylindrical lens effect in the acousto-optic deflector 7 can be neglected.

Then, the laser beam emitted from the acousto-optic deflector 7, and which is repeatedly deflected in the horizontal and vertical directions in a two-dimensional fashion, is projected through magnifying projection lenses 8 and 9 to a screen 10. The magnifying projection lenses 8 and 9 are used in order to magnify the picture size to a practical screen size. The picture size on the screen 10 would otherwise be small due to the fact that the deflection angle of the deflector is as small as about 2 degrees.

As described above, the laser beam scans the screen 10 in a so-called raster scanning fashion and a video signal is supplied to the light intensity modulator 3 in synchronism with the horizontal and vertical deflections, thus making it possible to display a television picture.

As compared with a mechanical type laser display apparatus, the laser display apparatus utilizing the above-mentioned acousto-optic deflector is free from vibration and noise and is excellent in durability. Further, this type of laser display apparatus is quick to start and is free from time jitter components. Furthermore, this laser display apparatus utilizing the acousto-optic deflector is small in size and light in weight as compared with a mechanical type laser display apparatus.

In the acousto-optic deflector 5, the supersonic wave generator 5$b$ is bonded to one surface of the acousto-optic medium 5$a$ to produce a progressive, supersonic wave in the acousto-optic medium 5$a$, whereby the laser beam incident on the acousto-optic medium 5$a$ is diffracted by the supersonic wave to change the direction in which the laser beam is emitted.

The higher the supersonic wave's frequency becomes, i.e. the shorter the supersonic wave's wavelength becomes, the larger the angle of the deflected light becomes. Accordingly, when the laser beam is scanned in a raster-scanning fashion by the acousto-optic deflector 5, the frequency of the supersonic wave must be swept from, for example, a high frequency to a low frequency and vice versa.

Although the sweep width $\Delta f$ of the frequency of the supersonic wave must be increased in order to obtain a large deflection scanning angle, the attenuation of the supersonic wave becomes remarkable in the high frequency band. Therefore, this technique is not useful in actual practice and has a limit. Generally, the scanning angle is very small, e.g. about 2 degrees. Accordingly, when a picture is displayed by this type of laser display apparatus, this scanning angle must be magnified and projected by using the projection lenses 8 and 9. In that case, the spot size is also magnified in accordance with the magnifying ratio so that the resolution of the picture, i.e., the number N of resolvable beam spots per scanning line is not related to the magnifying ratio and is determined as:

$$N = \pi D \Delta f / 2 \text{ } v \cos \theta$$

where D is the spot size of the laser beam, v is the sound velocity at which the supersonic wave proceeds in the acousto-optic medium 5$a$ and $\theta$ is the angle formed by the scanning central angle and the incident laser beam.

Accordingly, in order to obtain a picture of high resolution, i.e. a high figure of N, the spot size of the laser beam incident on the acousto-optic medium 5$a$ must be increased. There is then the substantial disadvantage that, if the spot size of the laser beam is increased, the scanning speed is decreased. This is because it takes a lot of time for the supersonic wave to propagate within the spot size. Assuming that the time necessary for switching the deflection direction is t, then the time t is expressed as:

$$t = \pi D / 2 \text{ } v \cos \theta$$

As a result, the time t is increased in proportion to the spot size. That is, high speed scanning and a display of high resolution are contrary to each other.

Consequently, according to the laser display apparatus utilizing the prior-art acousto-optic deflector, there is the limit that only a picture of, for example, an NTSC system in which the horizontal resolution is 320 lines and the scanning lines 525/frame can be displayed. As a result, the laser display apparatus utilizing the acousto-optic deflector for horizontal scanning can not be applied to a high definition television receiver system having, for example, 1125 scanning lines.

SUMMARY OF THE INVENTION

Accordingly, it is an object of the present invention to provide an improved laser beam deflection apparatus for horizontal scanning which can eliminate the aforenoted shortcomings and disadvantages encountered with the prior art.

More specifically, it is an object of the present invention to provide a laser beam deflection apparatus which generates less noise.

It is another object of the present invention to provide a laser beam deflection apparatus which is excellent in durability.

It is still another object of the present invention to provide a laser beam deflection apparatus which is small in size and which is light in weight.

It is a further object of the present invention to provide a laser beam deflection apparatus which can horizontally scan a laser beam at high speed.

It is yet a further object of the present invention to provide a laser beam deflection apparatus which can be suitably applied to a high definition television system having 1125 scanning lines.

According to an aspect of the present invention, a laser beam deflection apparatus for accomplishing the above and other objectives is comprised of a laser beam source for generating an input laser beam, a pair of acousto-optic deflection means for separately deflecting incoming laser beams in a given scan direction, beam switching means for alternately supplying the input laser beam from the laser beam source to the pair of acousto-optic deflection means, and projection means for projecting the deflected laser beams from the pair of acousto-optic deflection means onto the screen or the like. In the preferred embodiment, the incoming laser beam is intensity modulated and additional means are provided for deflecting the beam output from the projection means in a direction generally perpendicular to the given scan direction.

The above and other objects, features and advantages of the present invention will be apparent in the following detailed description of preferred embodiments, to be taken in conjunction with the accompanying drawings, in which like reference numerals are used to identify the same or similar parts in the several views.

DESCRIPTION OF THE PREFERRED EMBODIMENT

Figure 1:
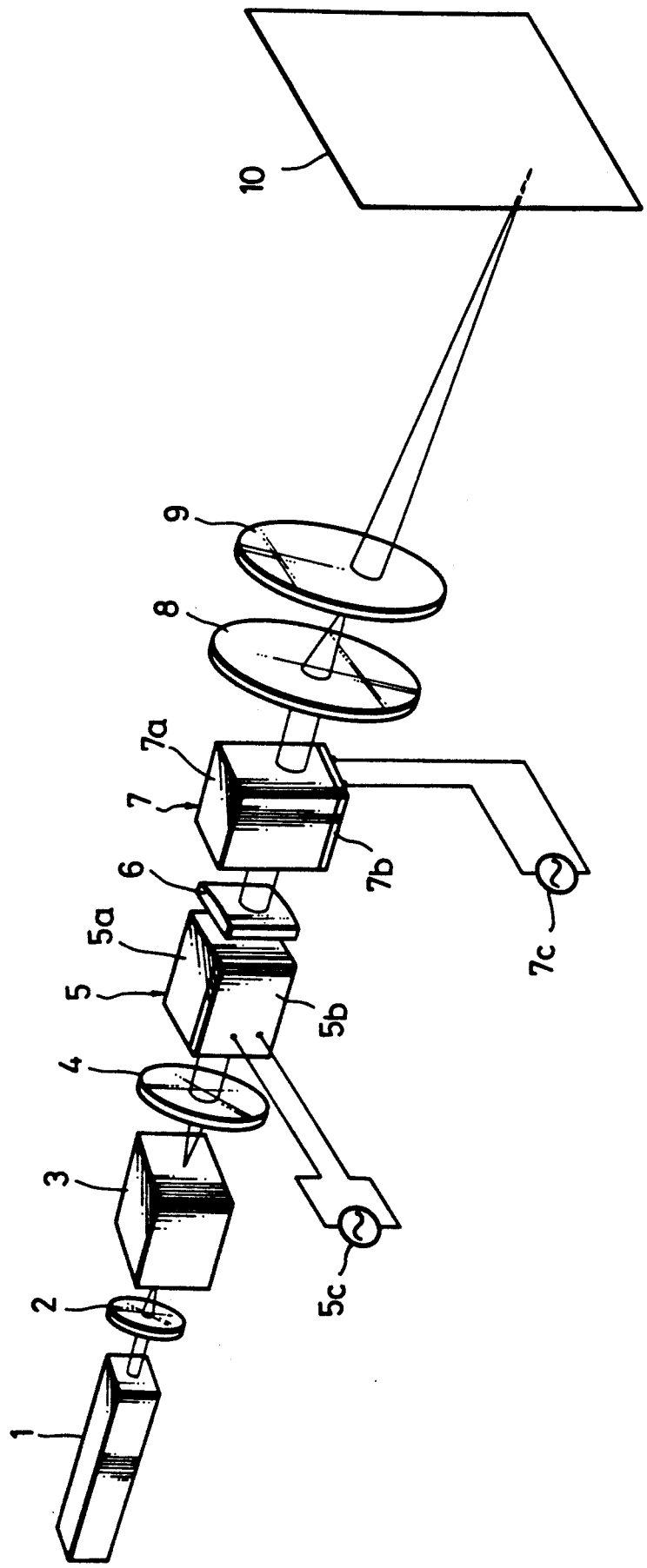
FIG. 1 is a schematic diagram showing an example of a prior-art laser beam deflection apparatus.

Referring to the drawings in detail, and initially to FIG. 2 which shows a main portion of the present invention, a first embodiment of the laser beam deflection apparatus according to the present invention will be described hereinafter.

Figure 2:
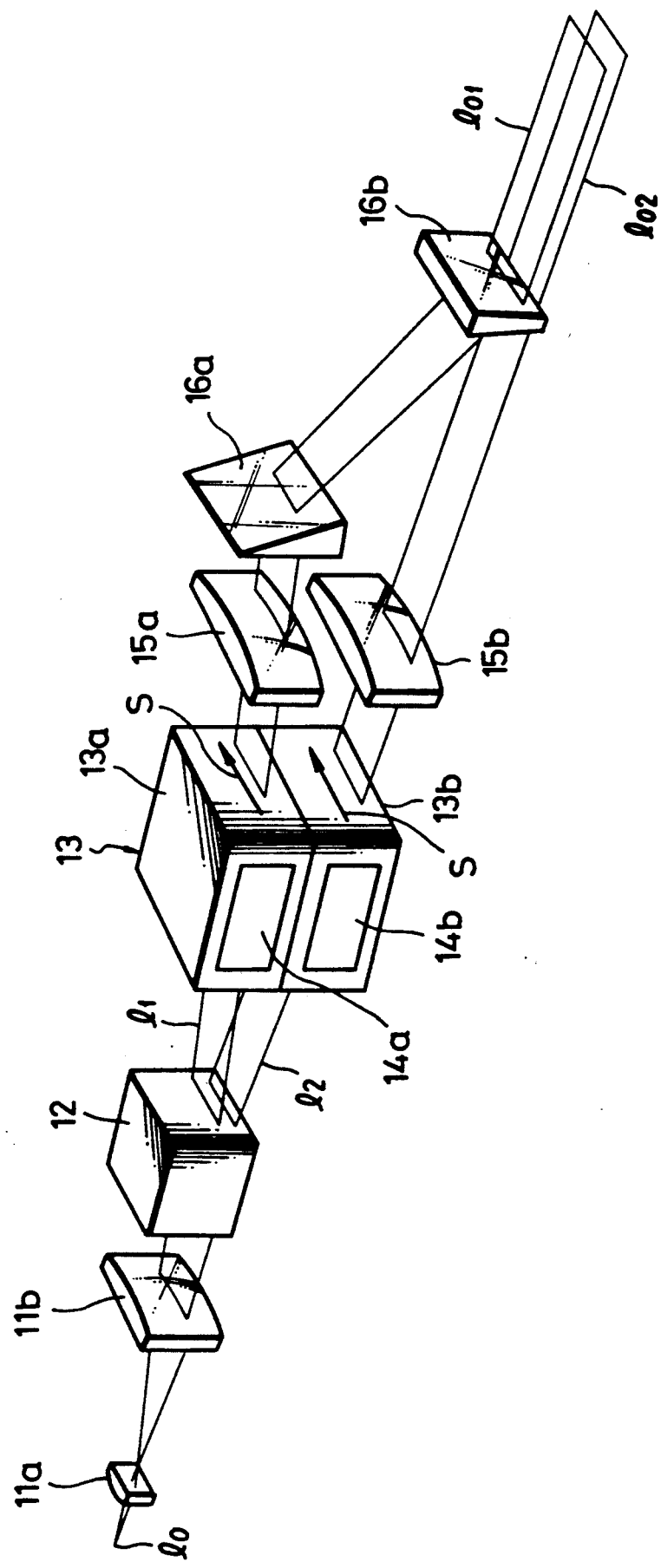
FIG. 2 is a schematic diagram showing a main portion of a first embodiment of a laser beam deflection apparatus according to the present invention.

As shown in FIG. 2, there is provided a laser beam $l_0$, generated by an unshown external source such as the elements 1-3 of FIG. 1, which has been intensity-modulated similarly to the example of the prior-art laser beam deflection apparatus shown in FIG. 1. This laser beam is introduced to a cylindrical lens $11a$, in which it is magnified in beam width and is then fed to a cylindrical lens $11b$, to thereby collimate the beam. Thus, this laser beam is made flat in which a cross section thereof is magnified only in the horizontal scanning direction. This flat laser beam is supplied to a beam switching device 12. The beam switching device 12 is formed of an acousto-optic deflector that switches the emitting direction of the incident flat laser beam to an upper or a lower direction in accordance with a switching signal (not shown) applied thereto. The deflection in which the laser beam is deflected in the upper or lower direction by the beam switching device 12 is not related to the resolution of the projected video image so that the beam size need not be increased in the deflection direction. Accordingly, if the direction of the "thickness" of the incident flat beam is coincident with the traveling direction of the supersonic wave, the switching speed in the emitting direction of the laser beam can be increased sufficiently.

The flat laser beam emitted from the beam switching device 12 is changed in the upper or lower direction in FIG. 2 at every horizontal scanning operation, thereby converting the beam $l_0$ to a flat beam $l_1$ or a flat beam $l_2$. The flat beams $l_1$ or $l_2$ are supplied to a horizontal scanning acousto-optic deflector 13. The horizontal scanning acousto-optic deflector 13 is formed of a pair of acousto-optic deflectors $13a$ and $13b$ closely positioned to each other. Supersonic wave generators $14a$ and $14b$ are attached to the acousto-optic deflectors $13a$ and $13b$, and are alternately driven by independent frequency oscillators (not shown), respectively.

More specifically, when the flat beam $l_1$ whose traveling direction is switched by the beam switching device 12 is supplied to the horizontal scanning acousto-optic deflector $13a$, its horizontal scanning is performed by the supersonic wave generator $14a$. Whereas, when the incident flat beam $l_1$ is supplied to the acousto-optic deflector $13b$, its horizontal scanning is performed by the supersonic wave generator $14b$. The supersonic waves generated by the supersonic wave generator $14a$ or $14b$ travel through the acousto-optic medium in the direction s, as shown in FIG. 2, to thereby to carry out the deflection scanning in the traveling direction of the supersonic wave. In that case, the width direction of the incident flat laser beam $l_1$ or $l_2$ is made coincident with the traveling direction s of the supersonic wave, whereby the resolution of the picture displayed on the screen of the horizontal deflection scanning lines can be sufficiently increased.

The laser beams emitted from the horizontal scanning acousto-optic deflectors $13a$ and $13b$ are introduced into cylindrical lenses $15a$ and $15b$, respectively, to thereby correct the so-called cylindrical lens effect.

The laser beam traveling through the cylindrical lens $15a$ travels through prisms $16a$ and $16b$, in which the laser beam is deflected to provide a laser beam $l_{01}$. The light path of this laser beam $l_{01}$ becomes parallel to that of a laser beam $l_{02}$ which passes through the cylindrical lens $15b$.

Figure 3:
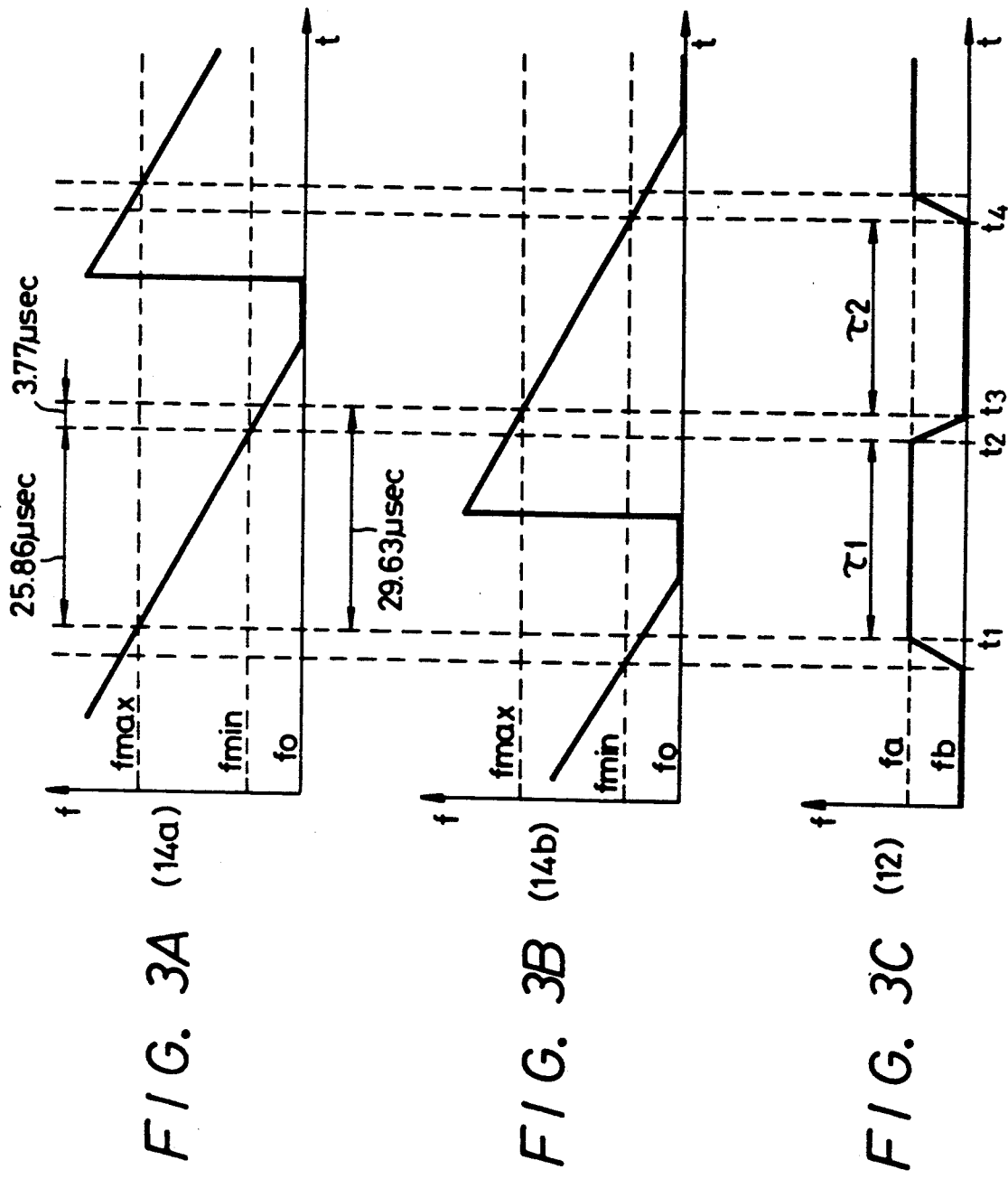
FIGS. 3A to 3C are waveform diagrams of high frequency voltages applied to an acousto-optic deflector used in the present invention, respectively.

The method for driving the beam switching device 12 and the horizontal scanning acousto-optic deflector 33 in the first embodiment of FIG. 2 by the supersonic wave will be described with reference to FIGS. 3A to 3c.

FIG. 3A shows a waveform diagram of a high frequency voltage applied to the supersonic wave generator $14a$ of the acousto-optic deflector $13a$; FIG. 3B shows a waveform diagram of a high frequency voltage applied to the supersonic wave generator $14b$ of the acousto-optic deflector $13b$; and FIG. 3C shows a waveform diagram of a high frequency voltage applied to the beam switching device 12.

When a high frequency voltage of frequency fa shown in FIG. 3C is applied to the beam switching device 12, the diffraction angle of the incident laser beam is increased so that the incident laser beam is emitted in the direction of the light path $l_1$ shown in FIG. 2, whereas when a high frequency voltage of frequency fb shown in FIG. 3C is applied to the beam switching device 12, the diffraction angle of incident laser beam is decreased so that the incident laser beam is emitted in the direction of the light path $l_2$ shown in FIG. 2. The frequency of the high frequency voltage is switched between the frequencies fa and fb at every horizontal scanning period $\tau_1$ or $\tau_2$ whereby the emitting direction of the laser beam is switched from $l_1$ to $l_2$ at every horizontal scanning.

FIG. 3A illustrates the waveform diagram of the high frequency voltage applied to the supersonic wave generator $14a$ of the acousto-optic deflector $13a$ located on the light path $l_1$ of the above-mentioned laser beam. In FIG. 3A, fmax and fmin assume upper and lower limits of effective drive frequencies of the acousto-optic deflectors $13a$ and $13b$, wherein the laser beam is deflected within the range of upper and lower limits fmax and fmin. At a timing point $t_1$ where the frequency of the voltage applied to the beam switching device 12 is switched to the frequency fa, the traveling direction of the laser beam is switched to the light path $l_1$. From this timing point $t_1$, the frequency of the high frequency voltage applied to the supersonic wave generator 14a is linearly decreased from the upper limit value fmax to the lower limit value fmin that is the scanning ending point. This frequency is continuously decreased down to a frequency $f_0$ after a timing point $t_2$ which reaches the lower limit value fmin. Then, the frequency of the high frequency voltage applied to the supersonic wave generator 14a is changed in a moment to a predetermined frequency larger than the frequency fmax.

As shown in FIG. 3B, from a timing point $t_3$ where the light path of the laser beam is switched to the light path $l_2$ by the beam switching device 12, a linear sweeping is carried out such that the frequency of the high frequency voltage applied to the supersonic wave generator 14b of the acousto-optic deflector 13b is changed from the upper limit value fmax to the lower limit value fmin.

As described above, the light path is switched at the completion of one horizontal scanning and the laser beam is introduced into another acousto-optic deflector which is in the standby mode after the recursive scanning is ended. Then, the next horizontal scanning is immediately started and this operation is repeated.

In FIGS. 3A, 3B and 3C, in the case of a high definition video signal having 1125 scanning lines, one horizontal scanning period, $\tau_1$ or $\tau_2$, is about 25.86 microseconds, and a blanking period, i.e., a period between the timing points $t_2$ and $t_3$ is 3.77 microseconds.

Figure 4:
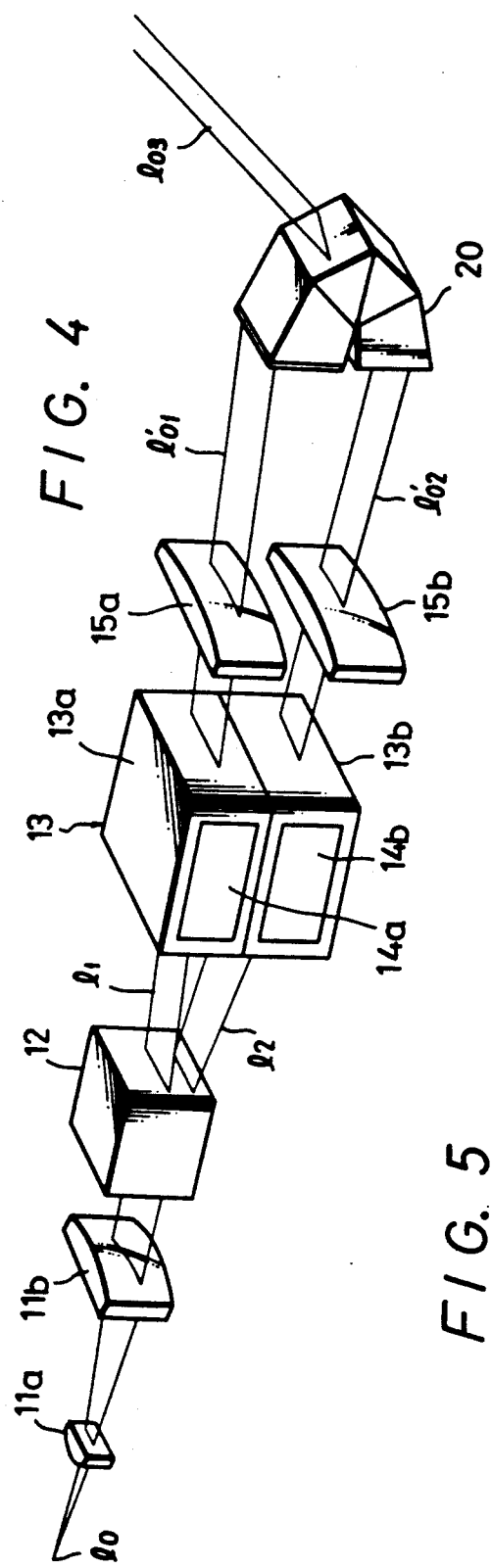
FIG. 4 is a schematic diagram showing a second embodiment of the laser beam deflection apparatus according to the present invention.

FIG. 4 shows a main portion of a second embodiment of the present invention. In FIG. 4, like parts corresponding to those of the first embodiment of FIG. 2 are marked with the same references. The second embodiment of FIG. 4 is different from the first embodiment of FIG. 2 only in that the prisms 16a and 16b are replaced with a beam mixing device 20.

With reference to FIG. 4, a laser beam $l'_{01}$ emitted from the horizontal acousto-optic deflector 13a through the cylindrical lens 15a is supplied to the laser beam mixing device 20 and is emitted from this laser beam mixing device 20 as a laser beam $l_{03}$. A laser beam $l'_{02}$ emitted from the horizontal acousto-optic deflector 13b through the cylindrical lens 15b is also supplied to the laser beam mixing device 20 and is emitted from this laser beam mixing device 20 as the laser beam $l_{03}$.

Figure 5:
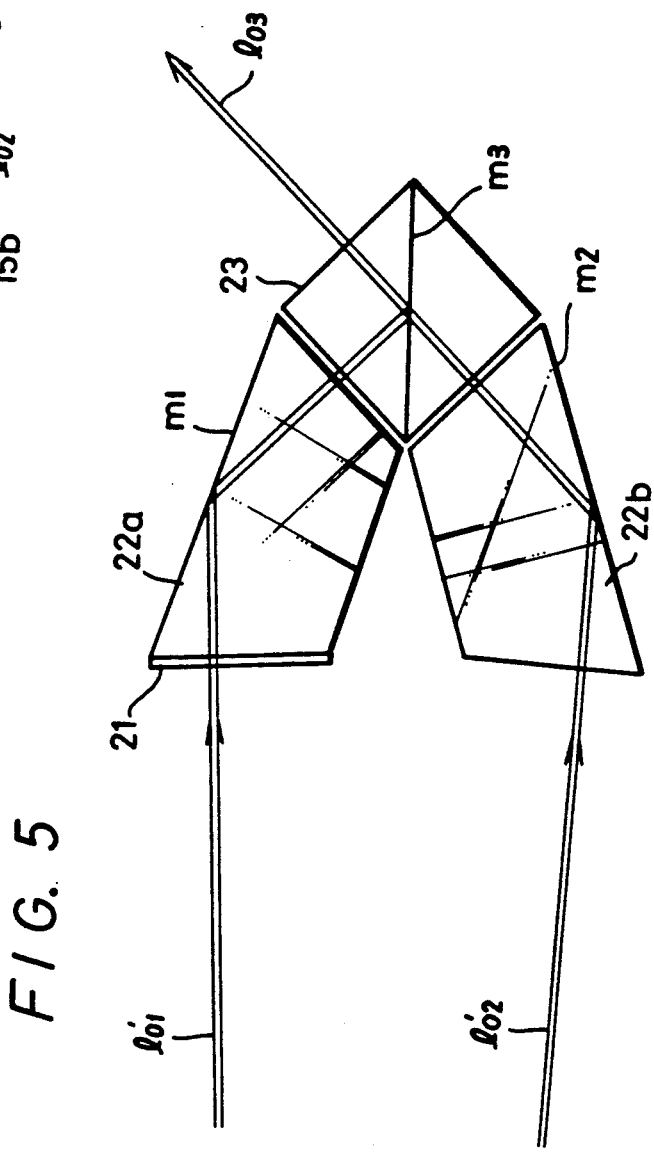
FIG. 5 is a schematic diagram to which reference will be made in explaining the condition of the laser beam in a beam mixing device of the present invention.

FIG. 5 shows how the laser beam mixing device 20 mixes the above-mentioned laser beams $l'_{01}$ and $l'_{02}$ to provide the laser beam $l_{03}$.

With reference to FIG. 5, the laser beam $l'_{01}$, traveling through the cylindrical lens 15a is passed through a half wave plate 21, in which the polarizing plane thereof is rotated by ¼ and is fed to a trapezoidal prism 22a. This laser beam is reflected by a reflecting surface $m_1$ of the trapezoidal prism 22a and is fed to a polarizing beam splitter 23. This polarizing beam splitter 23 is formed by bonding a pair of right-angle prisms via a multi-layered dielectric film $m_3$. The incident laser beam travels through or is reflected by the multi-layered dielectric film dependent on the polarized condition of the laser beam incident on the multi-layered dielectric film $m_3$. The laser beam reflected by the reflecting surface $m_1$ is reflected by the dielectric film $m_3$ and is emitted from the polarizing beam splitter 23 as the laser beam $l_{03}$.

The laser beam $l'_{02}$ traveling through the cylindrical lens 15b becomes incident on the trapezoidal prism 22b, in which it is reflected by a reflecting surface $m_2$ of the trapezoidal prism 22b and is fed to the polarizing beam splitter 23. The laser beam reflected by the reflecting surface $m_2$ travels through the multi-layered dielectric film $m_3$ of the polarizing beam splitter 23 and is emitted from the polarizing beam splitter 23 as the laser beam $l_{03}$.

As shown in the second embodiment of FIG. 4, if the laser beam mixing device 20 is located after the cylindrical lenses 15a and 15b, then the laser beams and $l'_{01}$ and $l'_{02}$ can travel along the same light path after they have traveled through the laser beam mixing device 20. Accordingly, a single laser beam $l_{03}$ emitted from the laser beam mixing device 20 is provided as though it were horizontally scanned at high speed by the single acousto-optic deflector.

Figure 6:
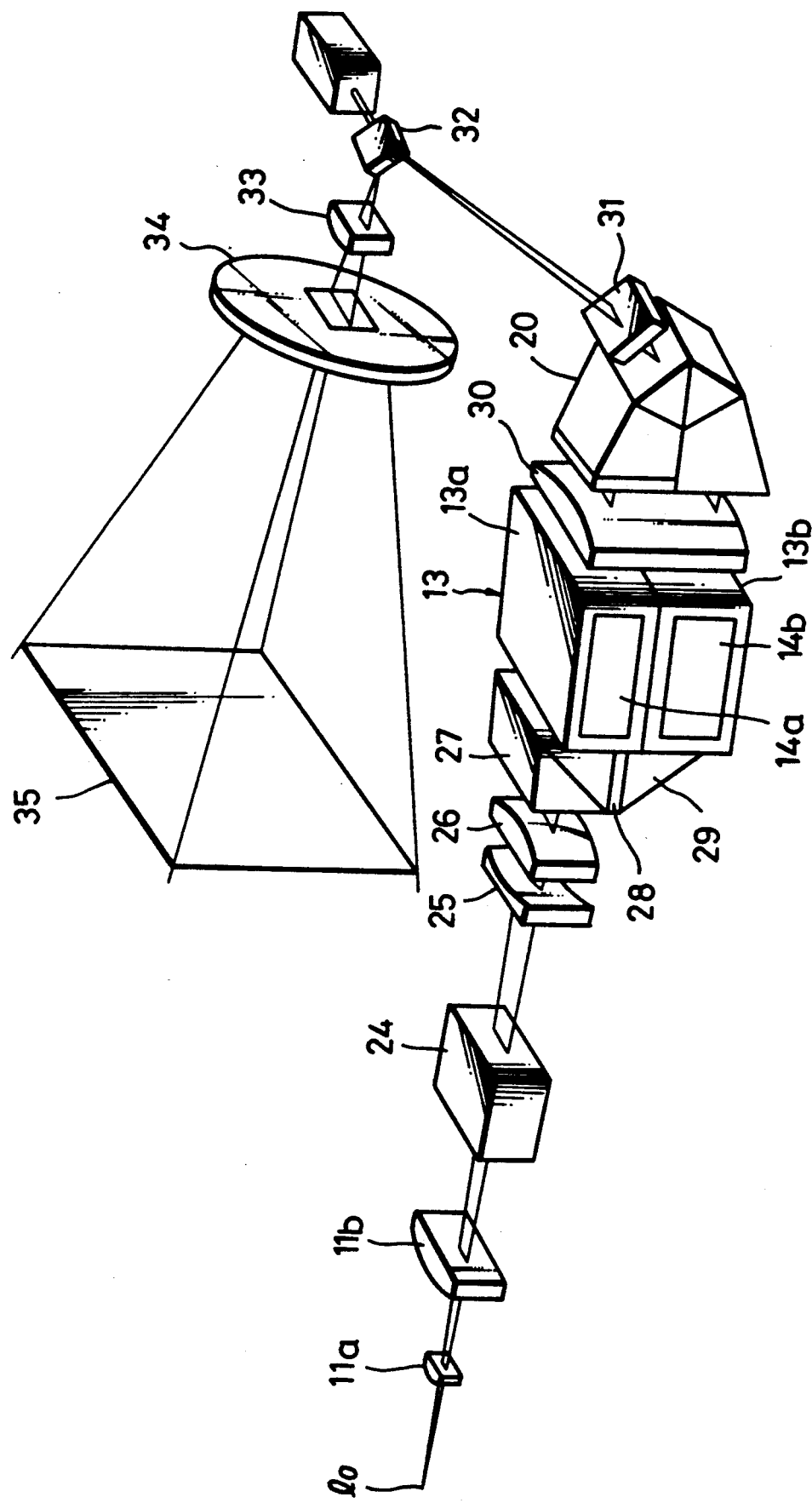
FIG. 6 is a schematic diagram showing a third embodiment of the laser beam deflection apparatus according to the present invention.
Figure 7:
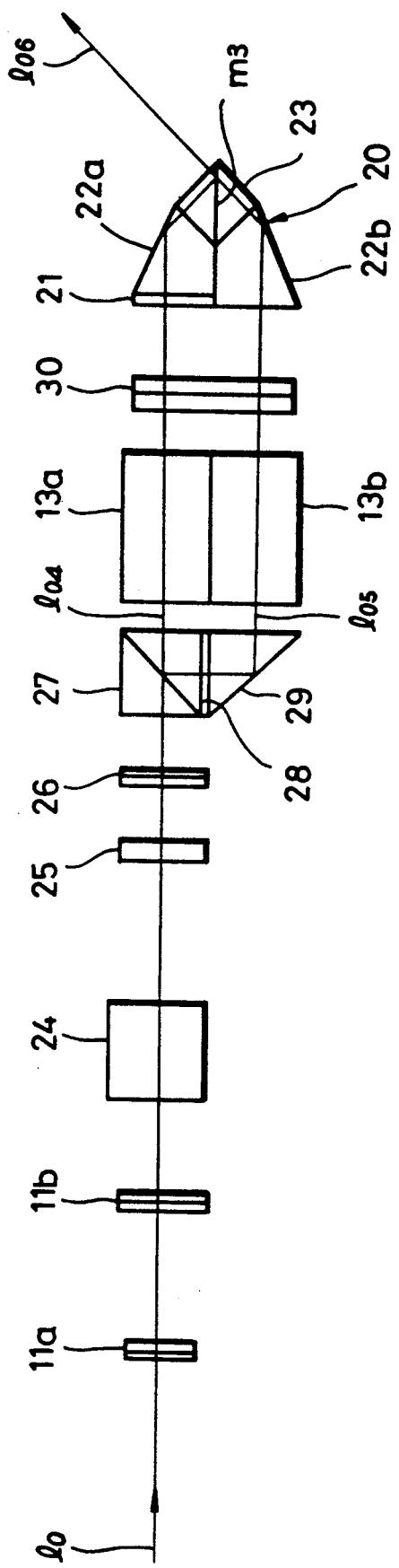
FIG. 7 is a schematic diagram to which reference will be made in explaining the condition of the laser beam in the third embodiment of the present invention.

FIG. 6 shows a main portion of the third embodiment of the present invention, and FIG. 7 is a schematic diagram used to explain the third embodiment of FIG. 6. In FIGS. 6 and 7, like parts corresponding to those of FIGS. 2 and 4 are marked with the same references and therefore need not be described in detail.

Referring to FIGS. 6 and 7, the intensity modulated laser beam $l_0$ is supplied through the cylindrical lenses 11a and 11b to a laser beam mode switching device 24. This laser beam mode switching device 24 is different from the laser beam switching device 12 in the first and second embodiments of FIGS. 2 and 4 and switches the mode of an incident laser beam to either a parallel wave or a perpendicular wave. The laser beam whose mode is switched to the parallel wave or the perpendicular wave by the laser beam mode switching device 24 is supplied through cylindrical lenses 25 and 26 to a polarizing beam splitter 27.

If the laser beam supplied to the polarizing beam splitter 27 is a parallel wave, then this laser beam is supplied through the polarizing beam splitter 27 to the horizontal acousto-optic deflector 13a as a laser beam $l_{04}$. If the laser beam supplied to the polarizing beam splitter 27 is a perpendicular wave, then this laser beam is supplied from the polarizing beam splitter 27 to a half wave plate 28, in which it is converted from a perpendicular wave to a parallel wave and is fed to a prism 29. The laser beam reflected by the prism 29 is supplied to the horizontal acousto-optic deflector 13b as a laser beam $l_{05}$.

After the laser beams $l_{04}$ and $l_{05}$ are horizontally scanned in the acousto-optic deflectors 13a and 13b, the laser beams are supplied from the acousto-optic deflectors 13a and 13b to the laser beam mixing device 20 via a cylindrical lens 30. The laser beam incident on the half wave plate 21 of the beam mixing device 20 is converted to a parallel wave, reflected by the trapezoidal prism 22a, then reflected by the multi-layered dielectric film $m_3$ of the polarizing beam splitter 23 and then emitted as a laser beam $l_{06}$. Further, the laser beam incident on the trapezoidal prism 22b of the laser beam mixing device 20 is reflected by the trapezoidal prism 22b, passed through the dielectric film $m_3$ of the polarizing beam splitter 23 and is emitted as the laser beam $l_{06}$.

As shown in FIG. 6, the laser beam $l_{06}$ is supplied through a cylindrical lens 31 to a galvano mirror 32 for vertical scanning. Then, the laser beam reflected by the galvano mirror 32 is supplied through a cylindrical lens 33 and a projection lens 34 to a screen 35. In that case, the galvano mirror 32 is used to carry out the vertical scanning of the laser beam.

Although no vertical deflection means is shown for the embodiments of FIGS. 2-5, it will be understood that these embodiments can use either the acousto-optic deflector 7 shown in FIG. 1 or the galvano mirror deflector 32 as shown in FIG. 6.

According to the embodiments of the present invention, in the laser scanning apparatus utilizing the acousto-optic deflector for horizontal scanning, the intensity modulated laser beam is split into two light paths or two modes and the split laser beams are alternately and horizontally scanned by the two acousto-optic deflectors, thus making it possible to realize a practical laser scanning apparatus which is low in noise, excellent in durability, small in size, light in weight and which can horizontally scan the laser beam at high speed. For example, the laser scanning apparatus of the invention is suitably applied to a laser scanning apparatus of high definition television system having, for example, 1125 horizontal scanning lines.

Further, the present invention is not limited to a laser display apparatus and may be applied to other apparatus such as a laser printer and the like if such apparatus displays a picture by horizontally scanning laser beams.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A laser beam deflection apparatus for projecting a laser beam onto a screen, comprising:
   (a) a laser beam source for generating an input laser beam;
   (b) a pair of acousto-optic deflection means for separately deflecting incoming laser beams in a given scan direction;
   (c) beam switching means for alternately supplying the input laser beam from the laser beam source to the pair of acousto-optic deflection means; and
   (d) means for projecting the deflected laser beams from the pair of acousto-optic deflection means onto the screen.

2. A laser beam deflection apparatus as cited in claim 1, wherein the beam switching means includes acousto-optic beam switching means which alternately directs the input laser beam by switching mode deflection to the pair of acousto-optic deflection means.

3. A laser beam deflection apparatus as cited in claim 1, wherein the beam switching means includes a beam mode changer for changing the polarity of the input laser beam, a polarized beam splitter, which is supplied with the light output of the beam mode changer, for distinguishing between parallel wave and perpendicular wave laser beams and outputting them as first and second separate laser beams having different polarities, the first of the separate laser beams being supplied to one of the pair of acousto-optic deflection means, and a half wave plate which is supplied with the second of the separate laser beams from the polarized beam splitter, the second separate beam after passing through the half wave plate being directed to the other of the pair of acousto-optic deflection means, whereby the input laser beam is alternately supplied to the pair of acousto-optic deflection means in accordance with a mode of polarization of the input laser beam as determined by the beam mode changer.

4. A laser beam deflection apparatus as cited in claim 1, further comprising beam intensity modulation means interposed between the laser beam source and the beam switching means for modulating the intensity of the laser beam by a video signal.

5. A laser beam deflection apparatus as cited in claim 4, wherein the beam intensity modulation means modulates the laser beam in accordance with video information received from an external source.

6. A laser beam deflection apparatus as cited in claim 4, wherein the projecting means includes vertical deflection means for deflecting laser beams output from the pair of acousto-optic deflection means in a direction generally perpendicular to the scan direction.

7. A laser beam deflection apparatus as cited in claim 1, wherein the projection means includes a pair of cylindrical lenses through which the beams output from the acousto-optic deflection means are passed.

8. A laser beam deflection apparatus as cited in claim 1, wherein the projection means includes a beam mixer for mixing together the beams output from the acousto-optic deflection mans and projecting a single, combined beam.

9. A laser beam deflection apparatus as cited in claim 8, wherein the projecting means includes vertical deflection means for deflecting the laser beam output from the beam mixer in a direction generally perpendicular to the scan direction.

10. A laser beam deflection apparatus for projecting an incoming laser beam from an external source onto a screen, comprising:
    (a) a pair of acousto-optic deflection mans for separately deflecting incoming laser beams in a given scan direction;
    (b) beam switching means for alternately supplying the input laser beam from the laser beam source to the pair of acousto-optic deflection means; and
    (c) means for projecting the deflected laser beams from the pair of acousto-optic deflection means onto the screen.

11. A laser beam deflection apparatus as cited in claim 10, further comprising beam intensity modulation means interposed between the laser beam source and the beam switching means for modulating the intensity of the laser beam by a video signal.

12. A laser beam deflection apparatus as cited in claim 11, wherein the beam intensity modulation means modulates the laser beam in accordance with video information received from an external source.

13. A laser beam deflection apparatus as cited in claim 11, wherein the projecting means includes vertical deflection means for deflecting laser beams output from the pair of acousto-optic deflection means in a direction generally perpendicular to the scan direction.

14. A laser beam deflection apparatus as cited in claim 10, wherein the projection means includes a pair of cylindrical lenses through which the beams output from the acousto-optic deflection means are passed.

15. A laser beam deflection apparatus as cited in claim 10, wherein the projection means includes a beam mixer for mixing together the beams output from the acousto-optic deflection means and projecting a single, combined beam.

16. A laser beam deflection apparatus as cited in claim 15, wherein the projecting means includes vertical deflection means for deflecting the laser beam output from the beam mixer in a direction generally perpendicular to the scan direction.

* * * * *